United States Patent [19]

Nowlin et al.

[11] Patent Number: 4,599,047
[45] Date of Patent: Jul. 8, 1986

[54] CHEMICAL FEED PUMP FLOW INDICATOR

[75] Inventors: Duane D. Nowlin, New Brighton; Raymond C. Walton, St. Paul, both of Minn.

[73] Assignee: Ecodyne Corporation, Chicago, Ill.

[21] Appl. No.: 667,875

[22] Filed: Nov. 2, 1984

[51] Int. Cl.⁴ .................. F04B 21/00; G01F 15/00
[52] U.S. Cl. .................................. 417/63; 116/273; 116/276
[58] Field of Search .............. 417/53, 63; 418/2; 116/273, 276; 73/440, 861.55, 861.57; 137/551, 559; 222/40, 155

[56] References Cited

U.S. PATENT DOCUMENTS

| | | | |
|---|---|---|---|
| 828,108 | 8/1906 | Graham | 116/273 X |
| 1,227,842 | 5/1917 | Sellin | 116/273 |
| 1,345,733 | 7/1920 | Ayres | 116/273 X |
| 1,556,185 | 10/1925 | Walker | 73/440 X |
| 1,730,127 | 10/1929 | Davenport | 116/273 |
| 1,889,705 | 11/1932 | Sherwood | 73/861.57 |
| 1,910,752 | 5/1933 | Coles | 116/273 |
| 2,827,008 | 3/1958 | Hodge | 116/273 |
| 2,970,561 | 2/1961 | Ashwood | 116/273 |
| 3,263,403 | 8/1966 | Ladusaw | 116/273 X |
| 3,672,467 | 6/1972 | Fleissner | 116/273 X |
| 4,197,097 | 4/1980 | Magorien et al. | 116/276 X |
| 4,257,748 | 3/1981 | Ives et al. | 417/63 |

FOREIGN PATENT DOCUMENTS

| | | | |
|---|---|---|---|
| 361493 | 5/1906 | France | 116/273 |
| 23339 | 2/1980 | Japan | 417/63 |
| 553640 | 5/1943 | United Kingdom | 116/273 |

OTHER PUBLICATIONS

Kontes Catalog FM-1, "Flowmeters for Laboratory and Industrial Use", p. 6.

Primary Examiner—William L. Freeh
Assistant Examiner—Paul F. Neils
Attorney, Agent, or Firm—Neuman, Williams, Anderson & Olson

[57] ABSTRACT

A flow indicator and a method for monitoring the operation of a chemical feed pump are provided. This indicator includes a housing defining a flow chamber and having an inlet through one end and an outlet through the other end. The inlet and the outlet of the housing are in communication with the fluid conduit of the pump, and the flow chamber is a vertical component of the flow path of the fluid flowing through the conduit. The housing contains two freely movable balls in the flow chamber, one ball having a specific gravity greater than that of the fluid and the other having a lower specific gravity. It is at least partially transparent to enable the operator of the indicator to observe the movement of the balls. The method for monitoring the pump involves placing the two balls in the flow chamber, connecting the indicator to the fluid conduit, operating the pump, and observing the action of the balls.

20 Claims, 5 Drawing Figures

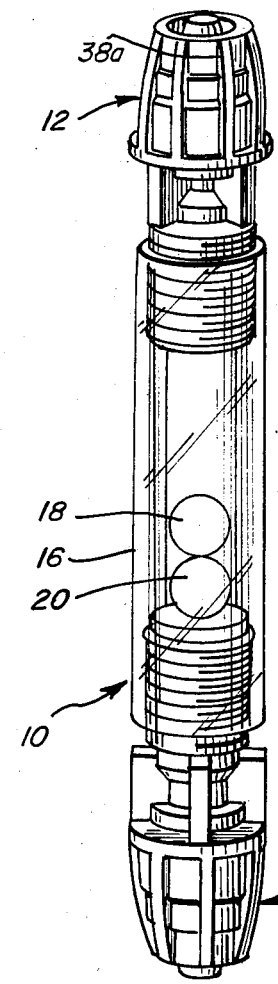
FIG. 1
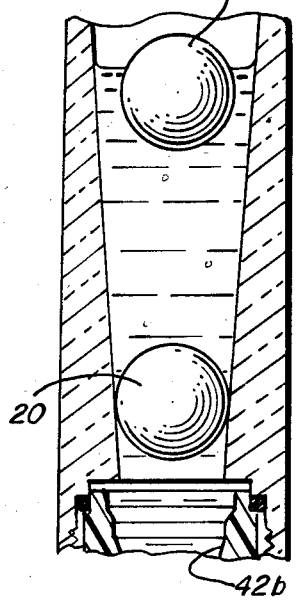
FIG. 2A
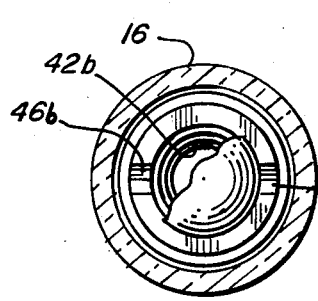
FIG. 3
FIG. 4
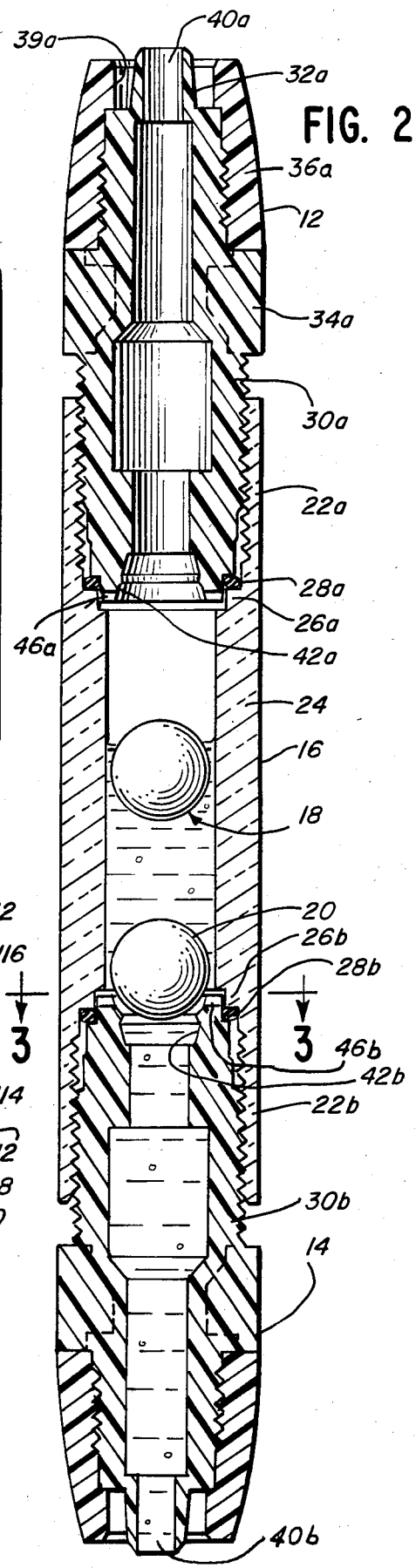
FIG. 2

CHEMICAL FEED PUMP FLOW INDICATOR

BACKGROUND OF THE INVENTION

1. Field of the Invention

The present invention generally relates to a hydraulic monitoring device and a method for using it and more specifically, to a flow indicator for monitoring the operation of a pump, in particular a chemical feed pump, and a method for using it to determine whether the pump is operating properly.

2. Background of the Invention

Many hydraulic systems include pumps which feed liquid into tubes and move it to a destination where it performs a mechanical or other type of function. In many applications, it is imperative that the operator of the system quickly determine whether a pump malfunction exists and whether the tubes into which the pump injects liquid have become plugged or contain air.

One prior method for making the above referred to determination includes using transparent tubing and watching for air bubbles which indicate a malfunction. However, this method lacks the accuracy and speed required in many modern sensing and control applications, and it requires that an operator closely watch the tubing for air bubbles.

Another prior method for detecting pump system malfunctions includes disconnecting the tubing connected to the output conduit of the pump while the pump operates allowing the liquid to spill out to determine whether the pump is injecting the liquid. This method is time consuming, and it presents a sanitation problem and a safety hazard. It presents a sanitation problem because the operator must drain the liquid into a container and then discard it. The safety hazard arises when the liquid is caustic or harmful to living tissue.

It is, therefore, a general object of the present invention to provide a sensing device that will simplify the monitoring of a feed pump and its input and output lines or conduits. More specifically, it is the object of the present invention to provide a flow indicator which will quickly and accurately sense a malfunction in the operation of a feed pump, a plug in the pumps input or output conduits, or air trapped in those conduits.

It is another object of the present invention to provide a flow indicator that is easy to use and inexpensive to manufacture.

It is yet another object of the present invention to provide a flow indicator which detects whether the feed pump or the line is blocked, or whether the line contains trapped air, both conditions being malfunctions.

It is still another object of the present invention to provide a flow indicator having at least a partially transparent flow chamber and a pair of balls, each with a different specific gravity, so that the movement of the balls within the flow chamber indicates the proper operation, or the malfunction of the pump.

It is a further object of the present invention to provide an improved method for monitoring the operation of a chemical feed pump.

Other objects, advantages and features of the present invention will become apparent upon reading the following detailed description and appended claims and upon reference to the accompanying drawings.

SUMMARY OF THE INVENTION

The foregoing objects of the present invention are achieved through the provision of a flow indicator for monitoring the operation of a pump, in particular a chemical feed pump. The indicator includes a housing which has a flow chamber which is at least partially transparent, a bottom fitting portion having an inlet and connected to one end of the flow chamber, and a top fitting portion having an outlet and connected to the other end of the flow chamber. In the normal and preferred position for operation, the indicator is placed at a break in the conduit, either downstream or upstream from a feed pump, so that the top fitting portion of the indicator is orientated vertically with respect to the bottom fitting portion of the indicator. The flow chamber thus becomes a vertical component of the flow path of the liquid flowing through the conduit.

The flow chamber contains two freely movable objects, preferably balls, disposed in the flow path of the liquid passing through the chamber. The first ball is made from a material with a specific gravity lower than that of the liquid. The second ball is made from a material with a specific gravity greater than that of the liquid. The portion of the flow chamber which is transparent allows the operator of the indicator to observe the action of the two balls and to observe the liquid. The relative movement of the balls located within the flow chamber enables the operator to determine whether there is a malfunction in the pumping system and whether the malfunction is a blockage in the conduit or pump or air in the conduit.

In the above embodiment, the movement of the balls within the chamber is visible to the operator. However, it is within the scope of the present invention to provide a portion of the housing of other means which would shield the balls from view under certain conditions while making the balls visible to the operator through the transparent portion of the chamber. The presence or absence of the balls from view would then indicate the proper operation or malfunction of the pump.

In operation, the fluid flowing to or from the feed pump flows into the chamber. During normal operation of the feed pump, the first ball with a specific gravity lower than that of the fluid floats up to the outlet of the flow chamber and stays there while the second ball with a specific gravity greater than that of the fluid lifts off the bottom of the chamber during the pumping stroke as the feed pump injects liquid into its output conduit, then slowly falls back to its bottom seat. When the flow chamber has fluid in it and the second ball fails to lift off the bottom of the chamber, either the pump has stopped functioning or the conduit has become plugged. If the second ball lifts off the bottom during the pumping stroke, but the first ball after floating to the top, drops down during the back stroke and then floats back up, the indicator shows another malfunction caused by air entering the output conduit or line of the pump. Of course, if the flow chamber does not have any fluid, the pump system is not operating.

BRIEF DESCRIPTION OF THE DRAWINGS

For a more complete understanding of this invention one should now refer to the embodiments illustrated in greater detail in the accompanying drawings and described below by way of examples of the invention. In the drawings:

FIG. 1 is a perspective view of the preferred embodiment of the feed pump flow indicator of the present invention.

FIG. 2 is a sectional view taken along line 2—2 of FIG. 1 through the vertical axis of the flow indicator, and it shows fluid flowing into the indicator.

FIG. 2A is a partial sectional view taken along line 2—2 of FIG. 1 through the vertical axis of the flow indicator and showing a modified flow chamber with sloping inner sidewalls.

FIG. 3 is a sectional view taken along line 3—3 of FIG. 2.

FIG. 4 is a schematic view of a second embodiment of the feed pump flow indicator of the present invention.

While the applicant will describe the invention in connection with a preferred embodiment and alternative embodiments, one should understand that the invention is not limited to these embodiments. Furthermore, one should understand that the drawings are not necessarily to scale. In certain instances, the applicant may have omitted details which are not necessary for an understanding of the present invention.

DETAILED DESCRIPTION OF THE DRAWINGS

Turning now to the drawings, FIG. 1 shows the preferred embodiment of a chemical feed pump flow indicator according to the invention generally at 10. The indicator monitors the operation of a chemical feed pump (not shown), and it generally comprises: a top fitting portion and a bottom fitting portion, 12 and 14 respectively, for connecting the flow indicator to the input or output conduit of the chemical feed pump; a hollow and transparent cylinder 16 disposed between the two fittings; and a top ball 18 and a bottom ball 20 positioned within the cylinder 16 in stacked relation in the flow path of a liquid or chemical solution flowing through the pump's conduit and the cylinder 16. The top ball 18 is made from a material with a specific gravity lower than that of the liquid, and the bottom ball 20 is made from a material with a specific gravity greater than that of the liquid. The amount or degree of difference between the specific gravity of the balls 18 and 20 and the fluid is not a critical aspect of the current invention and the selection of an appropriate specific gravity for each ball is well within the ability of one ordinarily skilled in the art. The fittings, 12 and 14, the cylinder 16 and the balls 18 and 20 are all made of corrosion resistant plastic material or any other suitable material that resists the chemical action of the liquid. The cylinder 16 is at least partially transparent to enable the operator of the feed pump to observe the liquid and the movement of the two balls 18 and 20 in response to the flow of the liquid passing through the indicator and to, thereby, monitor the operation of the feed pump.

Turning now to FIG. 2, the partially transparent cylinder 16 includes an upper portion 22a which receives the fitting 12, a lower portion 22b which receives the fitting 14, and a mid-section 24 defining a chamber through which the operator of the flow indicator observes the movement of the balls 18 and 20. The outside diameter of the cylinder 16 is substantially constant throughout the length of the cylinder. However, the inside diameter of the upper portion 22a and the lower portion 22b is greater than the inside diameter of the mid-section 24. In addition, the inner surfaces of the upper and lower portions 22a and 22b, are threaded to receive the corresponding fittings 12 and 14 while the inner surface of the mid-section 24 is smooth to allow for the unobstructed movement of the balls 18 and 20. The mid-section 24 has a constant internal diameter. A step 26a between the inner surfaces of upper portion 22a and mid-section 24 serves as a stop for the fitting 12 and a rubber ring washer 28a provides a leak-proof seal between the fitting 12 and the cylinder 16. Similarly, a step 26b and a rubber ring washer 28b serve the same function and provide the same result for fitting 14.

FIG. 2A shows a modified mid-section 24 designed for high capacity feed pumps which defines a frustoconical flow chamber with the bottom having a smaller internal diameter than the top. A high capacity feed pump lifts or raises the bottom ball 20 a substantial distance off of its seat on fitting 14 and the ball does not have sufficient time to sink back to the bottom before the next pumping stroke. In this situation the bottom ball 20 slowly moves up the flow chamber 24 after multiple pumping strokes until the movement of ball 20 becomes difficult to detect. The sloping sidewall feature of this alternative embodiment allows the bottom ball 20 to rapidly sink to its seat during the time interval between pumping strokes, as described below. The bottom seat of the ball 20 in this embodiment is the sides of inner sidewall of the cylinder 16 at the bottom of the chamber. This feature provides the added benefit of eliminating installation errors. The installer cannot place the balls 18 and 20 in the flow chamber if he first screws the cylinder 16 upside down because the inside diameter of the bottom portion of the cylinder is smaller than that of the diameter of the balls.

The fitting 12 is a two-piece connector with a main body portion 30a having a threaded outer surface at each of its ends, a nipple 32a at the top end, and four fins 34a spaced 90° apart and protruding from a reduced mid-section. To install this fitting 12, one must screw the bottom threaded section of the main body portion 30a into the upper portion 22a of the cylinder 16 using the fins 34a to grip the fitting. Then, after inserting the feed pump's input or output conduit (not shown) around the nipple 32a, the installer screws a threaded sleeve 36a, the second piece of the fitting 12, over the top threaded portion of the fitting 12 using ribs 38a (See FIG. 1), molded to the surface of the sleeve 36a, to grip the sleeve. When the sleeve 36a reaches its final position as shown in FIG. 2, it secures the conduit around the nipple 32a by clamping the conduit wall between the nipple 32a and a smooth annular surface 39a at its top inner end above the threaded portion.

The fitting 12 has an irregular opening 40a that extends through the entire length of the main body portion 30a for allowing the fluid to pass through the indicator. The end of the opening 40a located inside of the cylinder 16 as shown in FIG. 2 is a frustoconical catch 42a for the ball 18 when the ball floats up as described below. The shape of this section of the opening is such that when the ball 18 floats into it, it does not plug the opening and prevent fluid from flowing through. In the fitting 14, a similar frustoconical section 42b serves as a seat for the ball 20. This fitting 14 has the same parts and functions in the same manner as the fitting 12. FIG. 3 shows two notches, 44b, cut into the section 42b. These notches allow the fluid to flow through the cylinder 16 and prevent the ball 20 from plugging opening 40b. Similar notches, 46a, provided in section 42a, prevent the ball 18 from plugging opening 40a. One skilled in the art can appreciate that rather than using notches, other means can be used to prevent the balls from acting as a sealing valve, such as making the sections 42a and 42b oval in shape will serve the same purpose.

The ball 18 contained in the cylinder 16 has a smaller diameter than the inside diameter of the cylinder 16 so that fluid may easily flow through the cylinder. As stated above, the ball 18 is made of a material with a specific gravity lower than that of the fluid flowing through the indicator so that when the mid-section 24 of the cylinder 16 fills with fluid the ball 18 floats up and into section 42a of the opening 40a. The ball 20 also has a smaller diameter than the inside diameter of the cylinder 16. It is made of a material with a specific gravity greater than that of the fluid flowing through the indicator so that when the mid-section 24 of the cylinder 16 fills with fluid it will sink to the bottom into the section 42b of fitting 14. However, the ball 20 is light enough so that it will lift off out of its seat during the pumping stroke of the pump.

One skilled in the art can appreciate that rather than using another indicator when the pump injects a second fluid having a different specific gravity, the operator may replace the two balls in the indicator to correspond to the specific gravity of the second fluid. The construction of the indicator 10 allows the operator to replace the two balls 18 and 20, quickly and easily, as described in the installation procedure below.

To install the flow indicator of the present invention the installer first assembles the flow indicator. The installer inserts the rubber ring washers 28a and 28b in place inside the cylinder 16; screws the main body portion 30b of the fitting 14 into the lower portion 22b of the cylinder 16; inserts, first the ball 20 then the ball 18, into the mid-section 24 of the cylinder through the upper portion 22a; and screws the main body portion 30a of the fitting 12 into the upper portion 22a of the cylinder. Then, using a break in either the input or output conduit of a feed pump, the installer threads the downstream end of the conduit through the sleeve 36a and inserts the nipple 32a into this end of the conduit. The installer then screws the sleeve 36a over the top end of the main body portion 22a. The installer follows the same procedure in connecting the other end of the conduit to fitting 14.

In operation, fluid flowing to or from the feed pump flows into the flow indicator 10 through the opening 40b of the fitting 14, into the mid-section 24 of the cylinder 16, and out of the flow indicator through the opening 40a of the fitting 12. During normal operation of the feed pump, the ball 18 floats up to the edge of the fitting 12 and stays there as fluid flows through the indicator. The ball 20 stays down in its seat on fitting 14, but it lifts off of the fitting 14 during the pumping stroke as the feed pump injects fluid into its output conduit; then it slowly falls back to the bottom seat. When the flow chamber or cylinder 16 has fluid in it and the ball 20 fails to lift off the bottom of the mid-section 24 of the cylinder 16, either the pump has stopped functioning or its conduit has become plugged. If the ball 20 lifts off the bottom during the pumping stroke, but the ball 18 after initially floating to the top, drops down during the back stroke and then floats back up, the indicator shows another malfunction caused by air entering the output line or conduit of the pump.

FIG. 4 illustrates another embodiment of the flow indicator of the present invention at 110. This indicator comprises a housing 112 with a first vertical chamber 114 for containing a ball 116, a second vertical chamber 118 for containing a ball 120, a lower manifold 122, and an upper manifold 124. The lower manifold 122 channels or distributes liquid that flows into it through inlet 126 into chambers 114 and 118 through respective manifold outlets or chamber inlets 128 and 130. The upper manifold 124 channels liquid that flows into it through manifold inlets or chamber outlets 132 and 134 of chambers 114 and 118, respectively, into manifold outlet 136 and out of the flow indicator. Inlet 126 receives liquid from the input or output conduit of a chemical feed pump at a break in the conduit and outlet 136 communicates with the input or output conduit to place the fluid back into the conduit.

The ball 116 is made from a material with a specific gravity lower than that of the liquid flowing through the flow indicator so that when the chamber 114 fills with liquid, the ball 116 floats up to the top of the chamber. The ball 120 is made from a material with a specific gravity greater than that of the fluid flowing through the indicator so that when the chamber 118 fills with liquid it will stay at the bottom of the chamber. However, the ball 120 is light enough so that it will lift off, out of its seat during the pumping stroke of the pump.

The flow indicator embodiment of FIG. 4 has a seat and catch (not shown) for each flow chamber 114 and 118 similar to the seat 42b and the catch 42a of the preferred embodiment. It so has fittings like the fittings 12 and 14 of the preferred embodiment for connecting the inlet 126 and the outlet 136 to the input or output conduit of a feed pump.

The flow indicator embodiment of FIG. 4 operates in a similar manner as the flow indicator of the preferred embodiment. In addition, the housing 112 is, at least partially, transparent to enable the operator of the feed pump to observe the movement of the two balls 116 and 120 as they respond to the flow of the liquid passing through the indicator to thereby monitor the operation of the feed pump.

Thus, the applicants have provided a flow indicator capable of detecting feed pump malfunctions and plugged conduits in a feed pump system. The flow indicator is simple to operate, inexpensive to construct and reusable. It includes a top fitting portion and a bottom fitting portion for connecting the indicator to the input or output conduit of a chemical feed pump; a partially transparent housing is disposed between the two fittings and acts as a flow chamber; and two balls of different specific gravity are positioned within the housing. The portion of the housing which is transparent allows the operator of the indicator to observe the action of the two balls and to observe the liquid flowing through the flow chamber. The relative movement of the balls enables the operator to determine whether the feed pump is malfunctioning or whether the conduit has become plugged.

While the applicant has shown several embodiments of the invention, one will understand, of course, that the invention is not limited to these embodiments since those skilled in the art to which the invention pertains may make modifications and other embodiments of the principles of the invention, particularly upon considering the foregoing teachings. The applicants, therefore, by the appended claims, intend to cover any modifications and other embodiments and incorporate those features which constitute the essential features of this invention.

What is claimed is:

1. A flow indicator for use in monitoring the operation of a feed pump and serially connected to the fluid input or output conduit of the feed pump, said flow indicator comprising: an indicator body having at least one flow chamber therethrough, said chamber having an inlet through which fluid flows into said chamber and an outlet through which fluid discharges from said chamber after flowing through said chamber, said inlet being in communication with said fluid conduit of said pump, and said outlet being spaced vertically relative to said inlet and in communication with said fluid conduit so that said chamber forms a vertical section of said conduit, said indicator body being at least partially transparent; a first freely movable body means disposed in said chamber in the flow path of said fluid and having a specific gravity lower than that of the fluid and a second freely movable body means disposed in said chamber in the flow path of said fluid and having a specific gravity greater than that of the fluid for permitting the relative movement of the first and second body means to indicate whether the feed pump and fluid conduit are operating properly; and seat means disposed at both said inlet for receiving said second body means and at said outlet for receiving said first body means, said seat means allowing said fluid to engage said first and second body means and a portion of said fluid to flow around said first and second body means.

2. A flow indicator for use in monitoring the operation of a feed pump and serially connected to the fluid input or output conduit of the feed pump, said flow indicator comprising: an indicator body having at least one flow chamber therethrough, said chamber having an inlet through which fluid flows into said chamber and an outlet through which fluid discharges from said chamber after flowing through said chamber, said inlet being in communication with said fluid conduit of said pump, and said outlet being spaced vertically relative to said inlet and in communication with said fluid conduit so that said chamber forms a vertical section of said conduit; a first freely movable body means disposed in said chamber in the flow path of said fluid and having a specific gravity lower than that of the fluid for permitting said first body means to float to the top of the chamber when fluid fills the chamber, stay at the top of the chamber as long as fluid remains in the chamber, and momentarily drop down below the top of the chamber during the back stroke of the pump when air has entered the conduit of the feed pump; a second freely movable body means disposed in said chamber in the flow path of said fluid and having a specific gravity greater than that of the fluid for permitting said second body means to sink to the bottom of the chamber when fluid fills the chamber, lift off the bottom during the pumping stroke of said pump, and fall back to the bottom during the time interval between each pumping stroke; and seat means disposed at both said inlet for receiving said second body means and at said outlet for receiving said first body means, said seat means allowing said fluid to engage said first and second body means and a portion of said fluid to flow around said first and second body means; said indicator body being at least partially transparent.

3. A flow indicator as in claim 2 further comprising a first fitting means connected to said inlet and a second fitting means connected to said outlet.

4. A flow indicator as in claim 2, wherein said first and second freely movable body means are round ball-like pellets made of a corrosion resistant plastic material.

5. A flow indicator as in claim 2, wherein said chamber has a substantially uniform internal diameter at any point throughout its linear length and said first and second freely movable body means have a width which is less than said uniform internal diameter of said chamber so that fluid can flow freely around said body means.

6. A flow indicator as in claim 2, wherein said chamber has a first internal diameter at a point substantially adjacent to said inlet and a second internal diameter at a point substantially adjacent to said outlet and said first internal diameter is less than said second internal diameter.

7. A flow indicator as in claim 2, wherein said chamber has sloping internal walls and the cross sectional area of said chamber at any point between said inlet and said outlet is progressively greater and said first and second freely movable body means have a width which is greater than the width of the smallest cross-section.

8. A flow indicator as in claim 2, wherein said chamber comprises a first compartment means for containing said first freely movable body means, a second compartment means for containing said second freely movable body means, said first and second compartment each having an inlet at the bottom portion of the compartment and an outlet at the top portion of the compartment, a lower manifold communicating with said inlets of said first and second compartments, and an upper manifold communicating with said outlets of said first and second compartments.

9. A flow indicator as in claim 8, wherein said lower manifold communicates with said inlet of said indicator and said upper manifold communicates with said outlet of said indicator.

10. A flow indicator as in claim 8, wherein said first compartment is substantially parallel to said second compartment.

11. A flow indicator as in claim 8, wherein said first and second compartment each has a substantially uniform internal diameter at any point throughout its linear length and said first and second freely movable body means have a width which is less than said uniform internal diameter of said compartments so that fluid can flow freely around said body means.

12. A flow indicator as in claim 8, wherein said first and second compartment each has a first internal diameter at a point substantially adjacent to its inlet and a second internal diameter at a point substantially adjacent to its outlet and said first internal diameter is less than said second internal diameter.

13. A flow indicator as in claim 8, wherein said first and second compartment each has sloping internal walls and the cross sectional area of each said compartment at any point between said inlet and said outlet of said compartment is progressively greater and said first and second freely movable body means have a width which is greater than the width of the smallest cross-section.

14. An improved system for pumping fluid from a first location to a second location, said system comprising: a conduit defining a passageway for said fluid from said first location to said second location; a feed pump serially connected to said conduit for advancing said fluid through said conduit; and a flow indicator for use in monitoring the operation of said feed pump and serially connected to the fluid input or output conduit of the feed pump, said flow indicator including: an indicator body having at least one flow chamber therethrough, said chamber having an inlet through which fluid flows into said chamber and an outlet through which fluid discharges from said chamber after flowing through said chamber, said inlet being in communication with said fluid conduit of said pump, and said outlet being spaced vertically relative to said inlet and in communication with said fluid conduit so that said chamber forms a vertical section of said conduit; a first freely movable body means disposed in said chamber in the flow path of said fluid and having a specific gravity lower than that of the fluid for permitting said first body means to float to the top of the chamber when fluid fills the chamber, stay at the top of the chamber as long as fluid flows through the chamber, and drop down below the top of the chamber during the back stroke of said pump when air has entered the conduit of the feed pump; a second freely movable body means disposed in said chamber in the flow path of said fluid and having a specific gravity greater than that of the fluid for permitting said second body means to sink to the bottom of the chamber when fluid fills the chamber, lift off the bottom during the pumping stroke of said pump, and fall back to the bottom during the time interval between each pumping stroke; and seat means disposed at both said inlet for receiving said second body means and at said outlet for receiving said first body means, said seat means allowing said fluid to engage said first and second body means and a portion of said fluid to flow around said first and second body means; said indicator body being at least partially transparent.

15. A chemical feed pump flow indicator serially connected to the fluid input or output conduit of a fluid feed pump for monitoring the operation of said pump, said flow indicator comprising: a first and second flow cylinder and an upper and lower manifold, said cylinders each having an inlet and an outlet, said lower manifold being in communication with said fluid conduit of said pump and with said inlets of said first and second flow cylinders, said upper manifold being in communication with said fluid conduit of said pump and with said outlets of said first and second flow cylinders; a first freely movable body disposed in said first flow cylinder in the flow path of the fluid and having a specific gravity lower than that of the fluid so that said first body floats to the top of the first cylinder when fluid fills said cylinder; and a second freely movable body disposed in said second flow cylinder in the flow path of the fluid and having a specific gravity greater than that of the fluid so that said second body sinks to the bottom of the second cylinder when fluid fills said cylinder, lifts off the bottom during the pumping stroke of said pump, and falls slowly back to the bottom during the time interval between each pumping stroke; said first and second cylinders being at least partially transparent.

16. A flow indicator as in claim 15, wherein said first and second freely movable bodies are ball-like pellets.

17. A flow indicator as in claim 15, wherein said first and second cylinder each has a substantially uniform internal diameter at any point throughout its linear length and said first and second freely movable bodies have a width which is less than said uniform internal diameter of said cylinders so that fluid can flow freely around said bodies.

18. A flow indicator as in claim 15, wherein said first and second cylinder each has a first internal diameter at a point substantially adjacent to its inlet and a second internal diameter at a point substantially adjacent to its outlet and said first internal diameter is less than said second internal diameter.

19. A flow indicator as in claim 15, wherein said first and second cylinder each has sloping internal walls and the cross sectional area of each said cylinder at any point between its inlet and its outlet is progressively greater.

20. A method for monitoring the operation of a chemical feed pump using a flow indicator with a housing defining a flow chamber and having an inlet through which fluid from the fluid conduit of said pump flows into said chamber and an outlet spaced vertically from said inlet and used to communicate with said fluid conduit, so that fluid flows out from said chamber, into said outlet and then back into said conduit, and having a first and second freely movable body in said chamber in the flow path of said fluid of said indicator, said first body having a specific gravity greater than said fluid and said second body having a specific gravity lower than said fluid, wherein relative movements of the first and second bodies indicate whether the feed pump and fluid conduit are operating properly, said indicator also having seat means disposed at both said inlet for receiving said second body means and at said outlet for receiving said first body means, said seat means allowing said fluid to engage said first and second body means and a portion of said fluid to flow around said first and second body means; said method comprising the steps of: filling said chamber with fluid; and detecting the movement of said first and second bodies in said fluid as said pump injects fluid into or draws fluid out of said conduit.

* * * * *